Dec. 16, 1952 J. S. BLAKENEY 2,621,808
APPARATUS RESPONSIVE TO VARIATIONS IN LIQUID LEVEL
Filed Aug. 22, 1946 2 SHEETS—SHEET 1

INVENTOR
JOHN S. BLAKENEY
By Young, Emery & Thompson
ATTYS—

Dec. 16, 1952  J. S. BLAKENEY  2,621,808
APPARATUS RESPONSIVE TO VARIATIONS IN LIQUID LEVEL
Filed Aug. 22, 1946  2 SHEETS—SHEET 2
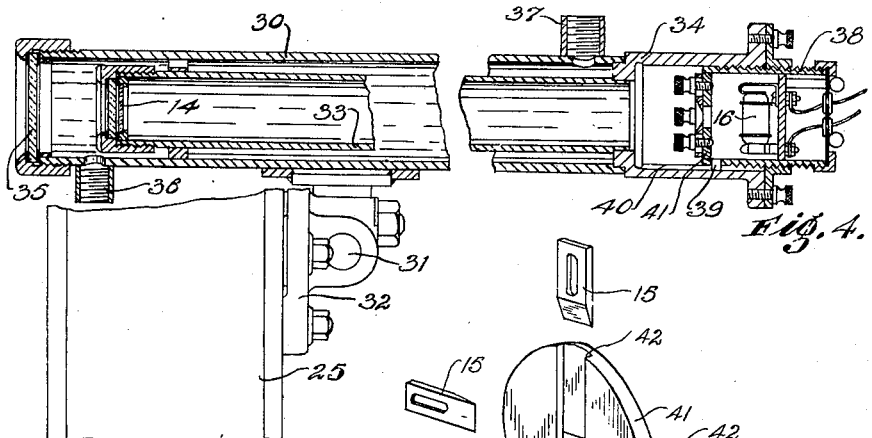
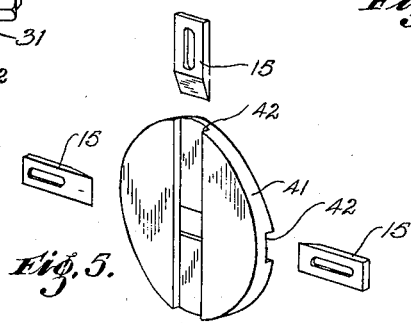
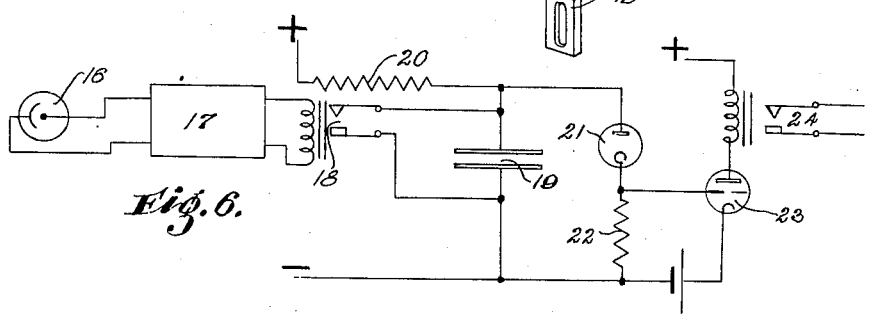
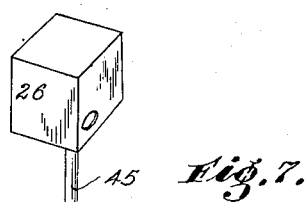
INVENTOR
JOHN S. BLAKENEY
BY Young, Emery & Thompson
ATTYS- Patented Dec. 16, 1952

2,621,808

UNITED STATES PATENT OFFICE 2,621,808

APPARATUS RESPONSIVE TO VARIATIONS IN LIQUID LEVEL

John Spencer Blakeney, Sydney, New South Wales, Australia, assignor to Frazier-Simplex, Inc., Washington, Pa., a corporation of Delaware Application August 22, 1946, Serial No. 692,396
In Australia August 24, 1945

18 Claims. (Cl. 214—18.2)

It is either necessary or desirable to provide means for indicating or controlling within suitable limits the level of molten glass in a continuous glass tank furnace and/or in an associated working chamber, and various proposals have been made but with indifferent success to achieve this result. The difficulties experienced are due to the high temperature (about 1200° C. to 1300° C.) of the molten glass, as floats, metal electrodes and the like quickly deteriorate under these severe conditions or are subject to other disadvantages.

Optical methods of securing the desired result have not heretofore appeared to be appropriate because the molten glass itself is luminous.

Now the general object of this invention is to provide an improved optical method of and means for indicating and/or controlling the level of molten materials, particularly molten glass.

Accordingly, the method of the invention broadly resides in directing modulated light by reflection from the surface of a liquid, e. g. molten glass, into proximity to light sensitive means and utilising said light sensitive means to control level indicating recording and/or regulating means.

Preferably the modulated light is incident on the liquid surface at a relatively small angle to such surface whereby not only is an optimum measure of reflection obtained, but also the variations in the angle of the reflected light corresponding to changes in the level are relatively large.

The incident light may be modulated either by supplying modulated electric current to a suitable type of electric lamp or by arranging shutter means between a steady light source and the surface of the molten material to interrupt the light at rapid intervals, the frequency of interruption being preferably of the order of about 300 to 500 per second.

Alternatively an uninterrupted beam of light incident on the liquid surface may be displaced angularly at the desired frequency so that the reflected beam is only intermittently directed towards the light sensitive means.

More particularly, the reflected modulated light is preferably directed by a converging lens onto a photoelectric cell arranged in a control circuit, the focus of the lens being preferably disposed in advance of the cell and adjacent to the lower end of an opaque obturating member which prevents the passage of modulated reflected light to the cell when the free surface of the liquid falls to a predetermined level.

The photoelectric cell necessarily receives a considerable amount of light which is emitted by the molten glass itself, but the light so received is substantially constant in intensity. Thus the current through the photoelectric cell due to the light incident thereon has a substantially constant component and a pulsating component, the latter being due to the modulated light. This pulsating component is separated from the constant component by amplifying means responsive only to alternating current, and this amplified current is utilised to control appropriate relay means.

Preferably a filter for infra-red rays is arranged in advance of the aforesaid lens to protect the photoelectric cell against damage thereby.

When the device is required to indicate the level of the liquid, the light source, the light receiving unit or an intermediate reflector is movably mounted and the movements thereof are automatically controlled by the relay means associated with the photoelectric cell in such a manner that the cell remains energised by the reflected modulated light, that is to say, the movable member is caused to undergo movements corresponding to the changes in the liquid level.

When, on the other hand, the device is required to control means for maintaining a substanitally constant level of the liquid, the said relay means is caused to control a batch feeding device, valve or other appropriate means by operation of which variations in the level may be corrected.

Preferably time delay means of any suitable type is interposed between the photoelectric cell and the mechanism controlled thereby to obviate the frequent stopping and starting of such mechanism for short intervals due to rapid fluctuations in the position of the real image of the light source. Such fluctuations are due to variations—known as the Schlieren effect—in the refractive index of the gaseous atmosphere above the molten glass.

In the drawings which show illustrative embodiments of the construction:

Figure 4 is a view in sectional side elevation of the receiving unit for reflected light.

Figure 5 is an exploded perspective view of a light obturating device incorporated in the light receiving unit.

Figure 6 is a diagram of one suitable arrangement of control circuits, and

Figure 7 is a diagrammatic perspective view showing one method of employing the invention to indicate the level of molten glass or the like.

Figure 1:
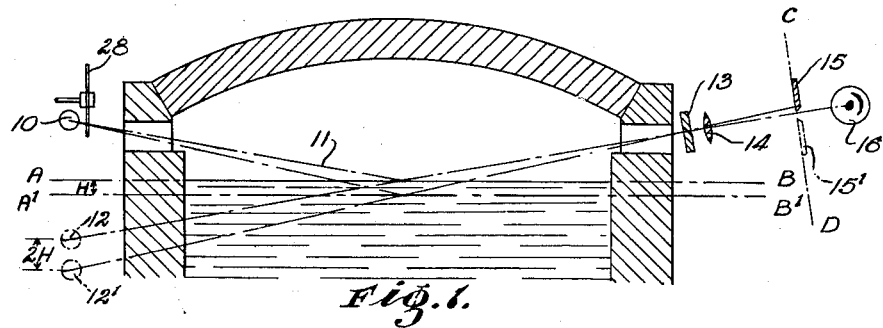
Figure 1 is a diagrammatic cross sectional view of a glass tank or chamber and illustrates the principle of the invention.

Figure 1 shows a holding chamber for molten glass, and in which the optimum level of the molten glass is at the position indicated by the line A—B. A light source 10 is arranged externally of the chamber at one side thereof, and rays 11 therefrom interrupted at regulated intervals by a continuously rotating electromagnetically vibrated or other suitably actuated shutter 28 pass through an opening in the adjacent side of the chamber and impinge at a small angle on the surface of the molten glass. A proportion of these incident rays which appear to originate at the mirror image 12 of the light source are reflected at the surface of the glass and pass through a further opening in the opposite side of the chamber and through a filter 13 for infra red rays to a lens 14.

The lens forms a small real image of the light surface 10 in the plane C—D, and when the level of the glass is at A—B, such real image is located immediately below the lower edge of an opaque obturating member 15, the front face of which is disposed in the plane C—D. Thus under such conditions the photoelectric cell 16 is illuminated with modulated light from the source 10.

In addition, the photoelectric cell continuously receives light of relatively high but substantially constant intensity which is emitted by the molten glass itself. Thus the current through the photoelectric cell comprises a steady component of constant value corresponding to the light emitted by the molten glass, and a unidirectional but pulsating component corresponding to the interrupted or modulated light from the source 10.

As hereafter explained, the circuit of the photoelectric cell is arranged in circuit with an amplifier for fluctuating currents, and the amplified current is directed to a relay which controls means for correcting variations in the level of the glass or for indicating such variations.

Thus the direct current component of the current through the photoelectric cell is without effect upon the relay. Now if the level of the molten glass shall fall by an amount H from A—B to A'—B', the mirror image of the light source 10 moves through a distance 2H from 12 to 12', and the real image of the light source produced by the lens 14 moves upwardly onto the lower edge of the obturating member 15 which thus prevents the passage of modulated light to the photoelectric cell. When the real image is small in the direction of image shift, and the focal length of the lens is relatively large, a small variation in the level of the molten glass is sufficient to interrupt completely the passage of modulated light to the photoelectric cell.

One suitable arrangement of the control circuits is shown in Figure 6 in which the photoelectric cell 16 is connected in circuit with an alternating circuit amplifier 17, the output circuit of which includes the winding of a relay 18. The contacts of this relay 18 are connected across the plates of a condenser 19 of a relatively large capacity, and which is connected through a large resistance 20 to a direct current source. Thus when the contacts of relay 18 are closed, they short circuit the condenser and prevent the charging thereof through resistance 20.

A gas filled voltage regulator tube 21, and a further resistance 22 are also connected in series across the plates of the condenser, while the cathode and grid of a triode 23 are connected to opposite ends of the resistance 22. The coil of a further relay 24 is arranged in the plate circuit of the triode and the contacts of this relay are arranged in the circuit of an electric motor (not shown) for actuating means for regulating the level of molten glass in the chamber. The level regulating means comprise a feeder for supplying batch materials to the glass tank, or a valve for controlling the flow of molten glass to the chamber from a melting tank arranged at a higher level.

Now when the condenser 19 is charged to the breakdown voltage of the regulator tube 21, the condenser discharges through such tube and the resistance 22, and the values of the various components are selected so that, provided the contacts of relay 18 are open, a continuous discharge through 21 and 22 is maintained. The voltage drop across resistance 22 under these conditions produces sufficient change in grid bias in the triode 23 to operate the relay 24, the contacts of which, therefore, remain closed.

It will be evident that when the contacts of relay 18 are closed, the condenser 19 is discharged therethrough and thus the condenser cannot be charged to the breakdown voltage of the regulating tube 21 until such relay is open, and after this relay is opened a predetermined time delay occurs before the condenser is charged to the breakdown voltage.

Thus, relay 24 cannot be energised unless the contacts of relay 18 have been open for a predetermined period which exceeds the period of the fluctuations in the image due to the aforesaid Schlieren effect.

The contacts of the relay 18 are closed when the winding thereof is energised, that is to say when the photoelectric cell is receiving modulated light reflected from the source 10. If, however, and as explained with reference to Figure 1, the real image of the light source should move upwardly onto the obturating member 15 so that the passage of modulated light to the photoelectric cell is prevented, the contacts of 18 are opened so that the condenser 19 commences to charge. If the contacts remain open for a period greater than the predetermined time lag, the condenser discharges in the manner above described, and the relay 24 is energised to close the circuit of the associated motor whereby the batch feeder is started or operated at an accelerated rate, or the valve is further opened as the case may be so that the level of molten glass in the chamber will be restored to the required position.

It is to be understood, however, that any other suitable type of time delay means and any other convenient arrangement of control circuits may be used in lieu of the arrangement shown in Figure 6.

In some cases it may be advantageous to arrange the obturating member immediately below instead of immediately above the optimum position of the real image, as shown in broken lines at 15' in Figure 1, and to arrange the relay 24 to cause the batch feeder or valve to operate or remain open unless the glass level rises to such an extent that the passage of modulated light to the cell is substantially completely cut off by the said obturating member.

Preferably any known type of protective device (not shown) is additionally provided to ensure that the said melting tank or chamber is not damaged in the event that due to any cause the automatic control means fails to operate correctly. Thus, for example, an electrode may be arranged to contact the molten glass when the level thereof reaches a predetermined upper limit, such electrode being incorporated in a control circuit which when closed effects the shutting down of the batch feeder or the closing of the valve to prevent any further elevation of the level of the molten glass.

Figure 2:
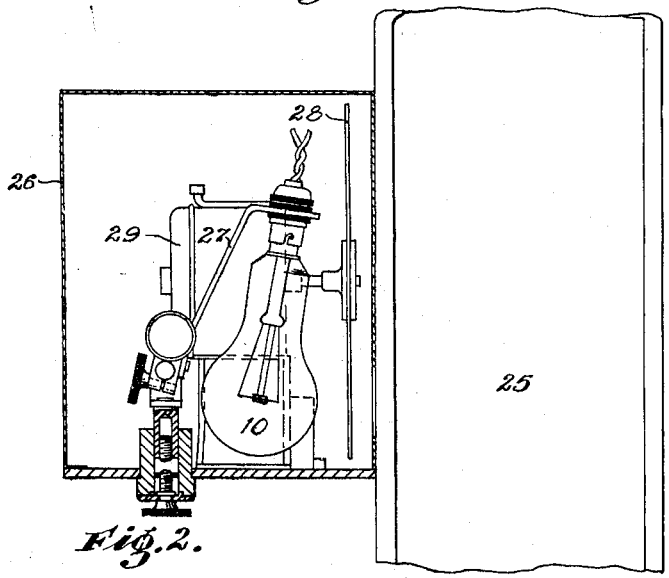
Figure 2 is a view in sectional side elevation of a lamp unit.
Figure 3:
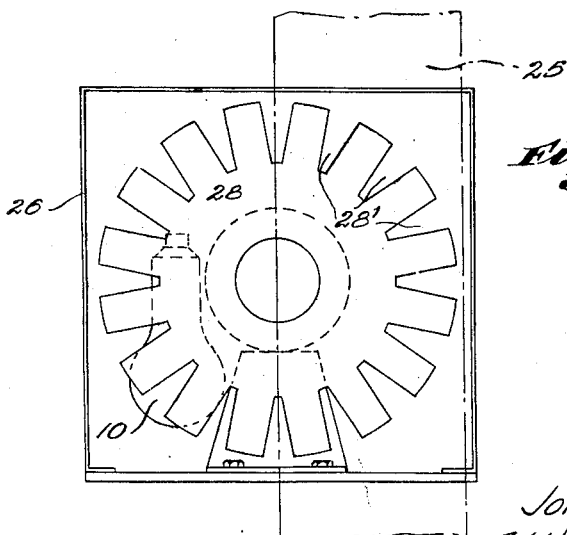
Figure 3 is a view in front elevation of the lamp unit.

The light source 10 is preferably incorporated in an adjustable lamp unit which may be constructed as shown in Figures 2 and 3, such lamp unit being conveniently supported on a standard 25 incorporated in the furnace structure. Thus this lamp unit may comprise a casing 26 in which an electric incandescent lamp 10 (e. g. a 200 watt lamp) is supported by a bracket 27, the latter being adjustably carried by the means shown, whereby the lamp may be moved vertically, transversely or angularly. The aforesaid rotatable shutter 28 which is rotatably supported within the casing 26 comprises a disc provided with radial slots 28', and same is driven at the requisite speed by an electric motor 29.

The light receiving unit incorporating the lens 14, and obturating member may conveniently be constructed as shown in Figure 4, such unit comprising an outer tube 30 which is pivotally connected adjacent its forward end to a transverse pivot pin 31 mounted on a bracket 32 secured to one of the furnace standards 25. Any suitable means (not shown) are provided for securing the tube 30 in any required angular position.

A second tube 33 is arranged concentrically within the tube 30, and the rear ends of both tubes are sealed to the forward end of a hollow casing 34 which is open at its rear end.

The lens 14 is mounted in the forward end of the inner tube, while a transparent glass 35 is sealed within the forward end of the outer tube 30. Water is continuously circulated through the space between the inner and outer tubes, 33 and 30 respectively, for which purpose an inlet pipe 36 is connected to the forward end of the outer tube, while an outlet pipe is connected at 37 to the rear end thereof. Thus the water between the lens 14 and the cover glass 35 constitutes the aforesaid filter 13 for infra red rays entering the receiving unit.

A longitudinally adjustable tube 38 arranged concentrically with and projecting into the open rear end of the hollow casing 34 is adjustable axially therein, but is restrained against rotation by a pin 39 which engages a longitudinal slot 40 in the inner periphery of the casing 34. A transverse disc 41 is secured to the forward end of the tube 38, and is formed in its front face with a diametrically opposed pair of vertical slots 42, the depth of which is equal to half the thickness of the disc, while a similar diametrically opposed pair of slots is arranged transversely in the back of said disc. Thus the inner ends of the front and rear slots are disposed in the same transverse plane, and an opening of square shape is provided at the center of the disc.

A shutter 15, having a bevelled inner edge, is arranged in each of the slots 42, and is adjustable radially therein, each such shutter being secured in position by a screw 44. Thus the size and position of the central aperture in the disc 41 is adjustable by means of the shutters 15, the front upper one of which in the illustrated embodiment comprises the obturating member hereinbefore referred to. Finally the photoelectric cell 16 is arranged within the tube 38 behind the disc 41.

Figure 7 shows one method of employing the invention to indicate variations in the level of molten glass or the like, the light receiving unit being constructed and arranged substantially as hereinbefore described. In this arrangement the lamp unit 26 is mounted on the upper end of a vertical plunger rod 45 secured to a plunger 46 which is slidable within a fixed vertical cylinder 47, the lamp unit being thus movable vertically, but being restrained by suitable means (not shown) against angular movements.

The plunger rod is extended downwards, and is connected to a dash pot 48 which prevents vibratory or rapid movements of the plunger 46.

Compressed air from a source (not shown) is led by a pipe 49 to a valve 50, having a reciprocable valve member 51 which controls the passage of pressure air to the lower end of the cylinder through a pipe 52. Air may continuously escape from the cylinder through a bleed passage 53 in the valve member so that the plunger and the lamp assembly tends continuously to fall. The valve is normally closed, but is opened by the relay 24 when the photoelectric cell 16 is illuminated with modulated light from the source 10. Thus when the lamp unit is raised to such a position that the real image of the light source is formed on the lower end of the obturating member 15 (Figure 1) the relay is deenergised so that the valve 50 is closed and the plunger and lamp assembly slowly fall owing to the escape of air through the bleed passage 53. Consequently, when the lamp assembly has descended through a small distance, the image of the light source moves below the obturating member and the photoelectric cell is illuminated with modulated light therefrom.

The relay is thus operated to open the valve 50 and admit compressed air to the lower end of the cylinder 47, and raise the plunger and lamp assembly. The lamp assembly thus continuously "hunts" about an average position which corresponds to the level of the glass in the tank.

The motion of the plunger is transmitted to a spindle 54 by rack and pinion gearing 55, such spindle being fitted with a disc 56, having lost motion means 57 for imparting angular movements to a concentric disc 58 supporting an insulated resistance wire 59, the ends of which are connected to a constant source 60 of E. M. F.

A contact 61 slidably engaging the slide wire and one end of the latter are connected to the terminals of a level indicator or recorder 62 which is suitably calibrated to indicate or record the level of the molten glass, it being understood that the voltage applied to 62 depends upon the length of the resistance wire 59 interposed in the circuit thereof.

The means 57 connecting the discs 56 and 68 permit of sufficient lost motion therebetween to obviate the transmission to the indicator or recorder 62 of the hunting movements of the lamp assembly.

It will of course be understood that the showing of the means 62 is diagrammatic and that it may constitute a batch charging motor and control therefor for controlling the supply of material to the furnace in accordance with the amount of glass withdrawn to thereby maintain a constant level of glass in the furnace.

It will be evident that various other practical applications of the invention may readily be devised, and also that the basic principle thereof may be employed in various ways and for different purposes. For example, a light source of substantial size may be employed and a sensitive light meter may be provided to measure variations in the intensity of modulated light falling on the photoelectric cell, and to cause same to be indicated and/or recorded in terms of glass level. Thus, the light source may be elongated vertically and the obturating member may be so arranged that approximately one half of the real image of the light source is intercepted by the obturating member when the liquid level is at a normal height, while the light from the remaining half of the image passes to the light sensitive cell. Thus when the image moves upwardly due to a fall in the level, the amount of light passing to the cell is decreased and vice versa. The invention moreover, is capable of being used for the purpose of indicating and/or controlling the level of liquids other than molten glass.

I claim:

1. Apparatus responsive to variations in the level of a liquid or melt comprising a light source from which light passes to the surface of the liquid at such an angle that a proportion thereof is reflected therefrom, means operable to modulate the said light, obturating means, lens means arranged in the path of said reflected modulated light and in advance of said obturating means and adapted to form an image of the light source adjacent said obturating means, photoelectric cell means arranged behind said obturating means whereby light from said image may pass said obturating means to said photoelectric cell means when the liquid level is disposed only at predetermined relative positions, a circuit incorporating said photoelectric cell means, discriminating means responsive only to modulated currents in said circuit, means controlled by said discriminating means and time lag means operable to prevent operation of said last mentioned means unless said discriminating means remains in operated condition for a predetermined time interval.

2. Apparatus according to claim 1 wherein said time lag means comprises a condenser, means operable to charge said condenser at a relatively slow rate, means operable to discharge said condenser when same is charged to a predetermined extent and a switch controlled by said discriminating means and arranged when closed to short circuit the said condenser.

3. Apparatus for regulating the level of a liquid or melt comprising a fixed light source from which light passes to the surface of the liquid at such an angle that a proportion thereof is reflected therefrom, means operable to modulate the said light, obturating means, lens means arranged in the path of said reflected modulated light and in advance of said obturating means and adapted to form an image of the light source adjacent said obturating means, photoelectric cell means arranged behind said obturating means whereby light from said image may pass said obturating means to said photoelectric cell means when the liquid level is disposed only at predetermined relative positions, said lens means, said obturating means and said photoelectric cell means being normally fixed in position, a circuit incorporating said photoelectric cell means, an amplifier connected to said circuit, said amplifier being responsive to modulated currents but not to steady currents, relay means controlled by the output of said amplifier, and means controlled by said relay means for regulating the level of said liquid.

4. Apparatus according to claim 3 for regulating the level of a liquid including time relay means interposed between said photoelectric cell means and said relay means, and operable to prevent operation of said relay means until said photoelectric cell means has been energised by modulated light for a predetermined period.

5. A furnace for a molten material having refractory walls extending above the level of the molten material, opposite walls having ports therein, a light projector at one port outside the furnace chamber for directing a selected beam of light at an acute angle against the surface of the molten material, a photo-electric cell at the other port outside the furnace chamber directed toward the point of impingement of the projected beam on the surface of the molten material at a given level, and means actuated by the photo-electric cell.

6. A furnace for a molten material having refractory walls extending above the level of the molten material, opposite walls having ports therein, a light projector at one port outside the furnace chamber for directing a selected beam of light at an acute angle against the surface of the molten material, a photo-electric cell at the other port outside the furnace chamber directed toward the point of impingement of the projected beam on the surface of the molten material at a given level, and means actuated by the photo-electric cell for causing material to be supplied to the furnace when the relation of the level to photo-cell falls and checking such supply when the level is restored to a predetermined point.

7. A furnace for a molten material having refractory walls extending above the level of the molten material, opposite walls having ports therein, a light projector at one port outside the furnace chamber for directing a selected beam of light at an acute angle against the surface of the molten material, a photo-electric cell at the other port outside the furnace chamber directed toward the point of impingement of the projected beam on the surface of the molten material at a given level, and means actuated by the photo-electric cell for indicating the change in liquid level.

8. A furnace for a molten material having refractory walls extending above the level of the molten material, opposite walls having ports therein, a light projector at one port outside the furnace chamber for directing a selected beam of light at an acute angle against the surface of the molten material, a photo-electric cell at the other port outside the furnace chamber directed toward the point of impingement of the projected beam on the surface of the molten material at a given level, means actuated by the photo-electric cell, and means for adjusting the level at which the reflected light strikes the photo-cell.

9. The combination with a receptacle having an incandescent body of liquid therein, of means for creating on the body of the liquid a light pattern which is in contrast to that emitted by the incandescent body, a photo-electric cell positioned to be influenced by said light pattern at one specific level only, and translating means actuated by said cell when influenced by said light pattern.

10. In level determining apparatus for a furnace containing molten material and having refractory walls extending above the level of the molten material, opposite walls having ports therein, a light projector at one port outside the furnace chamber for directing a selected beam of light at an acute angle against the surface of the molten material, a photo-electric cell at the other port outside the furnace chamber directed toward the point of impingement of the projected beam on the surface of the molten material at a given level, and translating means actuated by said cell.

11. In level determining apparatus for a furnace having an incandescent body of liquid therein, the combination comprising means for creating on the body of the liquid a light pattern which is in contrast to that emitted by the incandescent body, a photo-electric cell positioned to be influenced by said light pattern when said body is at a predetermined level, and translating means actuated by said cell when influenced by said light pattern.

12. In level determining apparatus for a furnace having an incandescent body of liquid therein, the combination comprising means for creating on the body of the liquid a light pattern which is in contrast to that emitted by the incandescent body, a photo-electric cell positioned to be influenced by said light pattern when said body is at a predetermined level, translating means actuated by said cell when influenced by said light pattern, and means for varying the level at which said light pattern will influence said cell.

13. In level determining apparatus for a furnace having an incandescent body of liquid therein, the combination comprising means for creating on the body of the liquid a light pattern which is in contrast to that emitted by the incandescent body including means for projecting an interrupted beam of light at an angle against the surface of the body, a photo-electric cell positioned to be influenced by the reflection of said interrupted beam of light, and translating means actuated by said cell when influenced by said reflection.

14. In level determining apparatus for a furnace having an incandescent body of liquid therein, the combination comprising means for creating on the body of the liquid a light pattern which is in contrast to that emitted by the incandescent body including means for projecting a beam of light at an angle against the surface of the body, a rotating disc having slots therein in the path of said light beam for interrupting said beam, a photo-electric cell positioned to be influenced by the reflection of said interrupted beam of light, and translating means actuated by said cell when influenced by said reflection.

15. In level determining apparatus for a furnace having an incandescent body of liquid therein, the combination comprising means for creating on the body of the liquid a light pattern which is in contrast to that emitted by the incandescent body including means for projecting a modulated beam of light at an angle against the surface of the body, light-sensitive means arranged to receive the reflection of said modulated beam of light, and translating means actuated by said light-sensitive means in response to the impression of said reflected modulated beam thereon.

16. A furnace for molten material having refractory walls extending above the level of the molten material, opposite walls having ports therein, a light projector at one port outside the furnace chamber for directing a beam of light at an acute angle against the surface of the molten material, means for periodically interrupting said beam of light, a photo-electric cell at the other port outside the furnace chamber directed toward the point of impingement of the projected beam on the surface of the molten material, and translating means actuated by the photo-electric cell in response to the impression thereon of the reflection of said interrupted beam of light.

17. A furnace for molten material having refractory walls extending above the level of the molten material, opposite walls having ports therein, light projecting means at one port outside the furnace chamber for directing a modulated beam of light against the surface of the molten material, light-sensitive means at the other port outside the furnace chamber directed toward the point of impingement of said modulated beam of light on the surface of the molten material, and translating means actuated by said light-sensitive means when it is subjected to the reflection of said modulated beam.

18. In level determining apparatus for a furnace having an incandescent body of liquid therein, the combination comprising means for projecting a modulated beam of light at an angle against the surface of the body, light-sensitive means arranged to receive the reflection of said modulated beam of light, circuit means incorporating said light-sensitive means and including discriminating means responsive only to modulated currents therein, translating means actuated by said circuit means, and time lag means operable to prevent operation of said translating means unless said discriminating means responds to modulated currents for a predetermined time interval.

JOHN SPENCER BLAKENEY.

REFERENCES CITED

The following references are of record in the file of this patent:

UNITED STATES PATENTS

| Number | Name | Date |
| --- | --- | --- |
| 352,647 | Ghegan | Nov. 16, 1886 |
| 1,455,795 | Logan | May 22, 1923 |
| 1,706,857 | Mathe | Mar. 26, 1929 |
| 1,737,126 | Reyling et al. | Nov. 26, 1926 |
| 1,818,018 | Stocker | Aug. 11, 1931 |
| 1,939,088 | Styer | Dec. 12, 1933 |
| 1,955,315 | Styer | Apr. 17, 1934 |
| 1,971,191 | Lord | Aug. 21, 1934 |
| 1,998,133 | Geffcken et al. | Apr. 16, 1935 |
| 2,118,651 | Macchi | May 24, 1938 |
| 2,216,575 | Seinfeld et al. | Oct. 1, 1940 |
| 2,297,534 | Brulin | Sept. 29, 1942 |
| 2,309,329 | Powers | Jan. 26, 1943 |
| 2,317,652 | Toney | Apr. 27, 1943 |
| 2,323,128 | Hare | June 29, 1943 |
| 2,350,820 | Rettinger | June 6, 1944 |
| 2,360,082 | Stone | Oct. 10, 1944 |
| 2,366,285 | Percy et al. | Jan. 2, 1945 |
| 2,411,531 | Engelhardt | Nov. 26, 1946 |
| 2,415,644 | Leonhard | Feb. 11, 1947 |
| 2,416,595 | Reynolds | Feb. 25, 1947 |
| 2,503,770 | Robinson | Apr. 11, 1950 |

FOREIGN PATENTS

| Number | Country | Date |
| --- | --- | --- |
| 853,118 | France | Mar. 11, 1940 |